United States Patent
Wakamatsu et al.

[15] 3,675,511
[45] July 11, 1972

[54] AUTOMATIC TRANSMISSION SYSTEM

[72] Inventors: Hisato Wakamatsu, Kariya-shi; Hisasi Kawai, Toyohashi-shi; Shin Ito; Seitoku Kubo, both of Toyota-shi, all of Japan

[73] Assignees: Toyota Jidosha Kogyo Kabushiki Kaisha, Toyota-shi, Japan; Nippondenso Kabushiki Kaisha, Kariya-shi, Aichi-ken, Japan

[22] Filed: Nov. 7, 1969

[21] Appl. No.: 874,934

[30] Foreign Application Priority Data

Feb. 28, 1969 Japan..................................44/15742

[52] U.S. Cl....................................74/866, 74/868, 74/869
[51] Int. Cl.........................................................B60k 21/00
[58] Field of Search.................................................74/866

[56] References Cited

UNITED STATES PATENTS

| | | | |
|---|---|---|---|
| 3,122,940 | 3/1964 | Shimwell et al. | 74/866 |
| 3,267,762 | 8/1966 | Reval | 74/866 X |
| 3,301,085 | 1/1967 | De Castelet | 74/866 |
| 3,354,744 | 11/1967 | Kuhnle et al. | 74/866 X |
| 3,433,101 | 3/1969 | Scholl et al. | 74/866 |
| 3,448,640 | 6/1969 | Nelson | 74/866 |

*Primary Examiner*—Arthur T. McKeon
*Attorney*—Cushman, Darby & Cushman

[57] ABSTRACT

An automatic transmission system having means for electrically detecting the load on the engine and the speed of the vehicle, an electronic control device operative by receiving the detected signals to issue speed changing instructions best suited for the particular speed changing condition, and a hydraulic actuating circuit for operating the actuators in response to the speed changing instructions to thereby change the gear ratio.

6 Claims, 21 Drawing Figures

PATENTED JUL 11 1972 3,675,511

INVENTORS
Hisato Wakamatsu
Hisashi Kawai
Shin Ito
Seitoku Kubo

BY
Cushman Darby & Cushman
ATTORNEYS

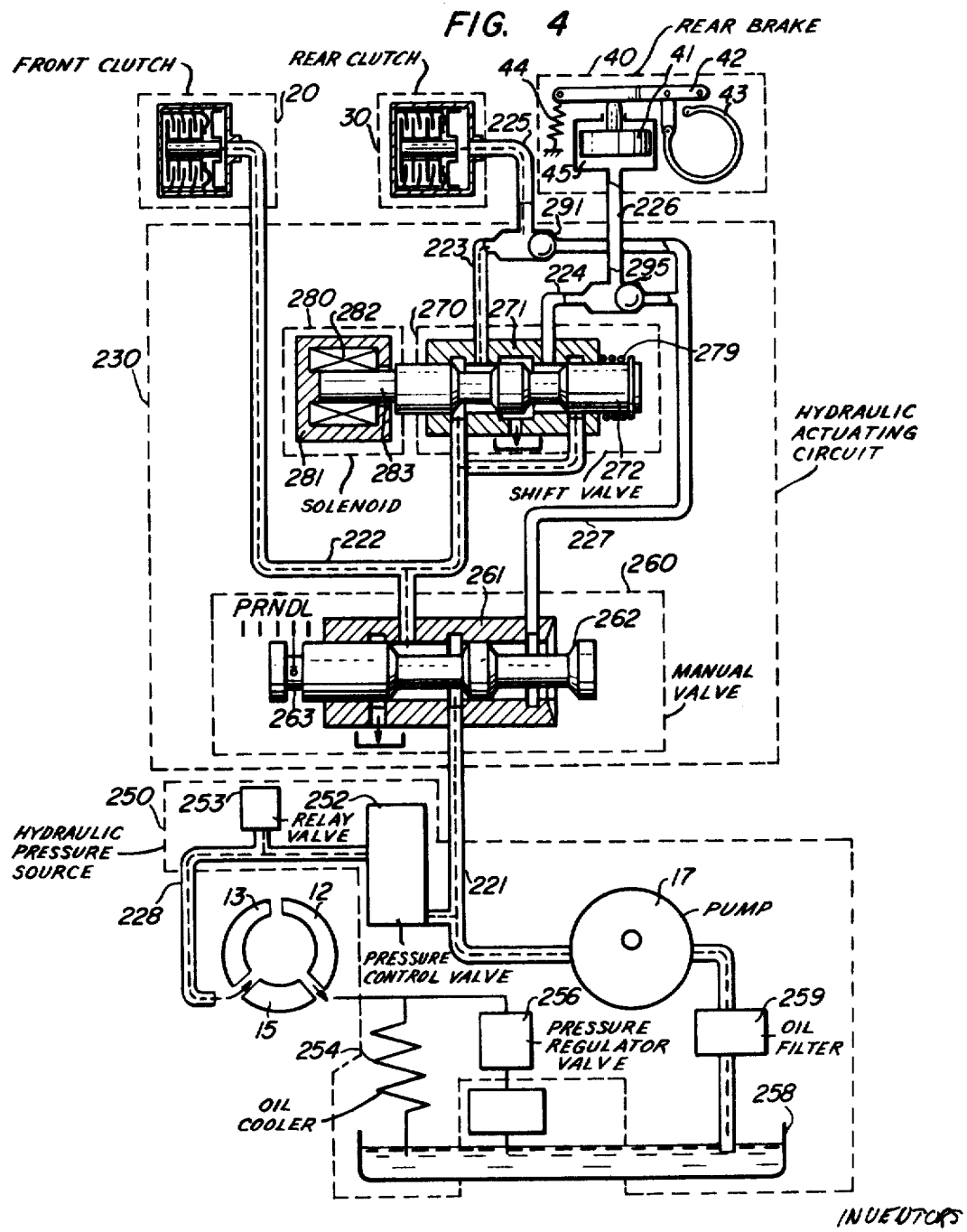

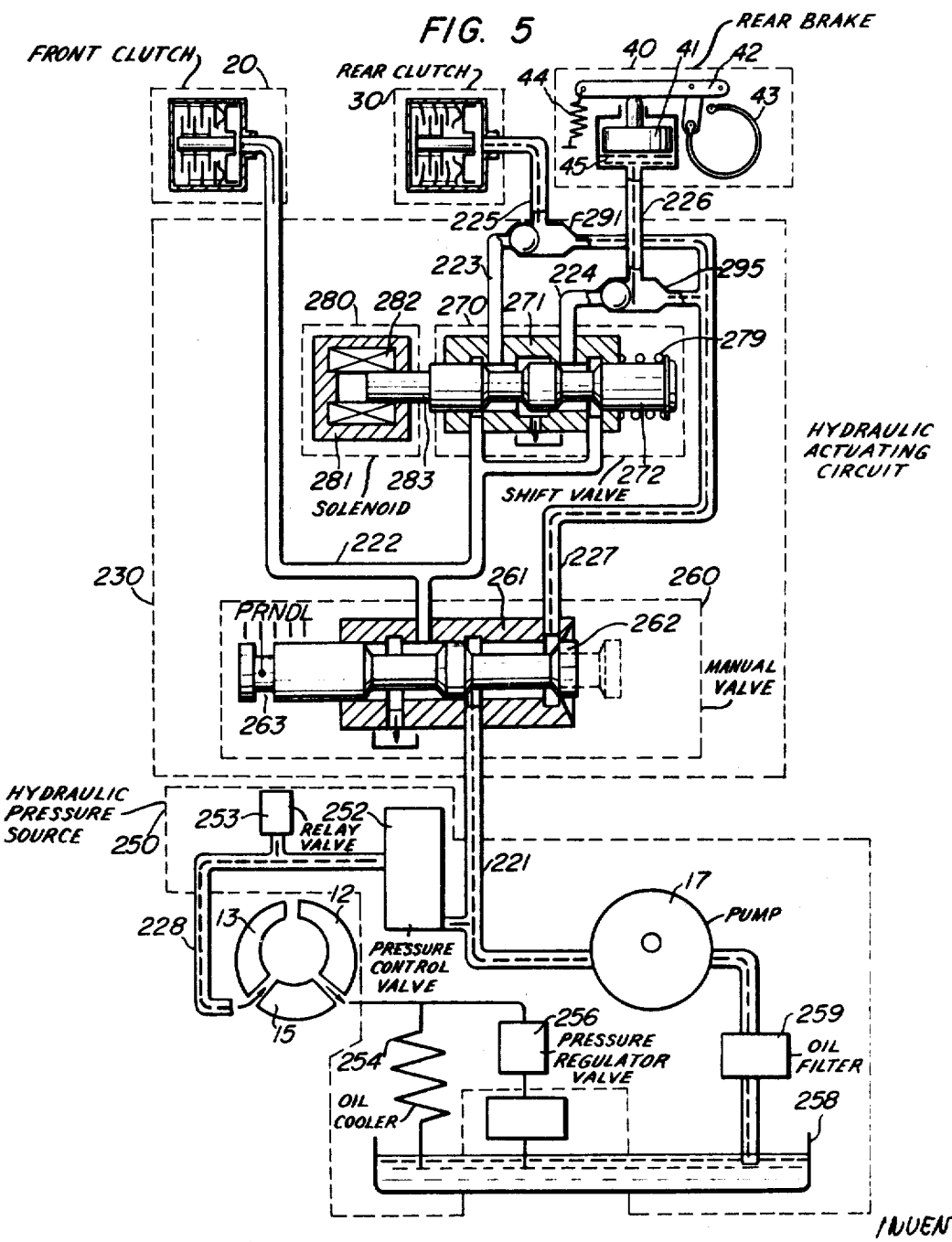

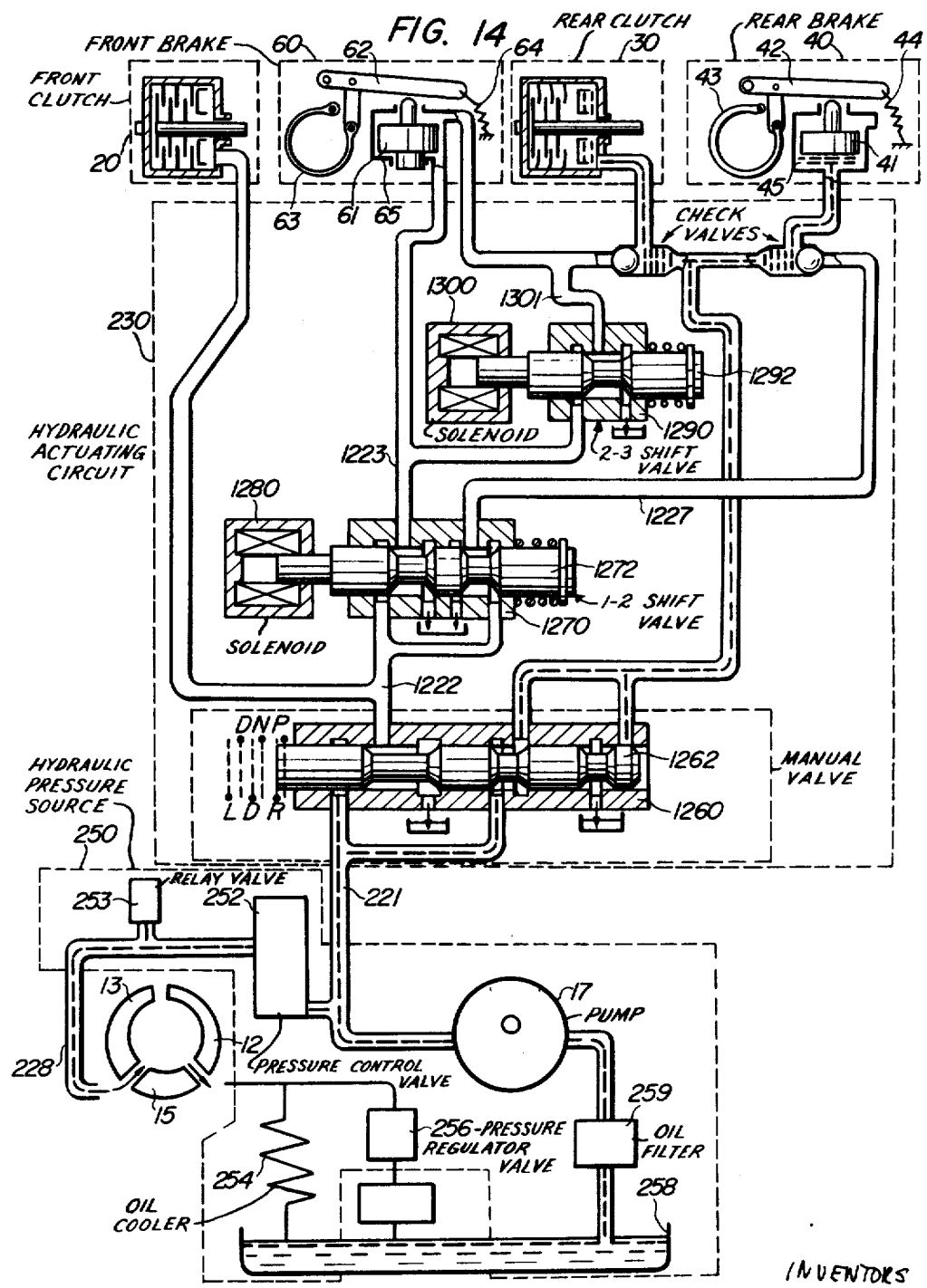

AUTOMATIC TRANSMISSION SYSTEM

This invention relates to a transmission system for automative vehicles and the like, and more particularly to an automatic transmission system comprising a hydraulic torque converter and a multi-speed gear transmission means.

In an automatic transmission system employed heretofore in common passenger cars, the speed changing point is generally determined from a signal representing the vehicle speed (taken from the output shaft of a multi-speed gear transmission means) or a signal representing the number of revolutions of the prime mover or internal combustion engine and a signal representing the negative pressure (boost pressure) in the air intake pipe of the internal combustion engine or a signal representing the amount of depression of the accelerator pedal actuated by the driver. A commonly employed method comprises obtaining these signals in the form of a high and a low hydraulic pressure, determining the speed changing point on the basis of the interrelation between these two hydraulic pressures, and opening and closing related valves for selectively hydraulically operating an actuator such as a multiple disc clutch and a brake band. Thus, in the conventional automatic transmission system which is wholly controlled by means of hydraulic pressure, the detected signals in the form of hydraulic pressures are subject to errors and are therefore generally inaccurate. This means that the speed changing point is also frequently subjected to error. Further, the conventional hydraulic actuating circuit is defective in that it is generally complex, difficult to regulate and has a bulky volume.

The present invention is featured by the fact that it comprises means for electrically detecting the load on the engine and the speed of the vehicle, an electronic control device operative by receiving the detected signals to issue speed changing instructions most suitable for the particular speed changing condition, and a hydraulic actuating circuit for actuating the actuators in response to the speed changing instructions thereby to change the gear ratio.

It is a primary object of the present invention to provide an automatic transmission system which can operate more accurately than heretofore and is provided with a hydraulic actuating system having a simplified mechanical structure thereby preventing any dislocation of the speed changing point due to fluctuations in the hydraulic pressure.

In accordance with the present invention, the following advantages can be obtained:

1. Briefly, the automatic transmission system according to the present invention is composed of three essential parts, a torque converter transmission unit, a hydraulic actuating circuit, and an electronic control device. Thus, the hydraulic actuating circuit constitutes an actuator driving system which does not include an electronic circuit system. Therefore, the hydraulic actuating circuit has a simple structure, is small in size and can be easily made by mass production.

The electronic control device of small size and light weight can easily be obtained by the use of semiconductor elements or by utilizing the technique of integration and can thus operate with high reliability.

For the necessary control of the transmission system, the transmission unit may merely include therein a conventional hydraulic pump and a small-sized revolution detecting means. Thus, the transmission unit is small in size and of light weight. These features, such as, small size, light weight, high efficiency and high reliability are effective for use in vehicles, especially automobiles.

2. According to the present invention, the speed changing points (lines) are approximately given by stepped lines having a plurality of break points. Thus, in the case of a two-forward speed automatic transmission system, the electronic control device may be composed of a digital-analog conversion circuit (hereinafter to be referred to as a D – A converter), a circuit responsive to the opening of the throttle valve (hereinafter to be referred to as a throttle valve opening responsive circuit), a discriminating circuit, a feedback circuit associated with the discriminating circuit, and a amplifier. In the case of a three-forward speed automatic transmission system, the electronic control device may be composed of a D – A converter, a throttle valve opening responsive circuit, two discriminating circuits, feedback circuits associated with the respective discriminating circuits, and two amplifiers circuits. This arrangement is very simple compared with the case of providing an electronic circuit to deal with each of the speed changing points. The electronic control device having such a structure is substantially free from trouble, has a high reliability and can be made at a low cost.

3. Simple means such as a revolution detector (such as an electromagnetic pickup) and a solenoid are used to set up an interrelation between the torque converter transmission unit, the hydraulic actuating circuit and the electronic control device. Further, the transmission unit, the hydraulic actuating circuit and the electronic control device are based on solid, fluid and electrical mechanisms, respectively. Thus, no unnecessary interference exists there-between and the operation is stable and free from any variations.

4. The source of hydraulic pressure for the hydraulic actuating circuit may merely have a suitable fixed pressure selected for the specific purpose. Thus, the hydraulic pressure source has a simple structure and exhibits a high efficiency and stability. Moreover, the source can easily be serviced.

5. It is possible to very easily alter the speed changing point (line) which has been quite difficult with the mechanism of prior art hydraulically controlled automatic transmission systems. For example, the speed changing point may simply be altered by varying the setting of a variable resistor in the case of the automatic transmission system of the present invention to deal with vehicles of different kinds. Thus, a few kinds of automatic transmission systems are applicable to a wide variety of vehicles.

6. A vehicle driver can suitably alter the speed changing point (line) depending on a variation in the operating conditions of the vehicle. Thus, the automatic transmission system can meet wider operating conditions.

The present invention will be described in detail with reference to the accompanying drawings, in which:

FIGS. 2, 3, 4 and 5 are diagrammatic views illustrating the operation of a hydraulic actuating circuit when the present invention is applied to a two-forward speed automatic transmission system, in which the hydraulic actuating circuit is shown in its N, DL, DH and R positions, respectively;

FIG. 14 is a diagrammatic view illustrating the operation of a hydraulic actuating circuit when the present invention is applied to a three-forward speed automatic transmission system;

It is the first feature of the present invention that the automatic transmission system is essentially composed of three parts, that is, a torque converter transmission unit, a hydraulic actuating circuit and an electronic control device as apparent from an embodiment thereof which will be described in detail hereunder.

STRUCTURE OF TWO-FORWARD SPEED AUTOMATIC TRANSMISSION UNIT

Figure 1:
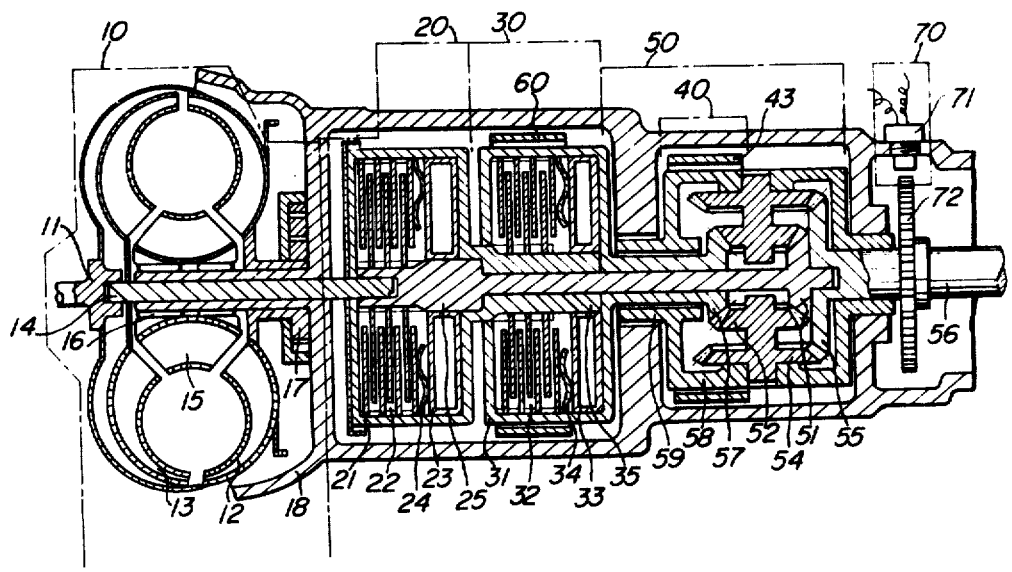
FIG. 1 is a sectional view of a transmission unit preferably used in an automatic transmission system embodying the present invention.

A two-forward speed automatic transmission unit equipped with a hydraulic torque converter as shown in FIG. 1 will be taken as a typical example of the automatic transmission unit. It will be understood, however, that the present invention is in no way limited to such a two-forward speed automatic transmission unit and is similarly applicable to a three or more forward speed automatic transmission unit.

Referring to FIG. 1, the two-forward speed automatic transmission unit comprises a hydraulic torque converter 10, a front clutch 20, a rear clutch 30, a rear brake 40 and a gear train 50. At the input side of the hydraulic torque converter 10, the rotary output shaft of an internal combustion engine (not shown) is directly connected to a shaft 11 which is in turn directly connected to a torque converter pump 12. The torque converter 10 includes the torque converter pump 12, a torque converter turbine 13 disposed opposite to the pump 12, and a stator 15 disposed between the pump 12 and the turbine 13. The stator 15 is provided with a one-way clutch 16. Since the operation of these elements is well known in the art, any detailed description will not be given herein. The torque converter pump 12 discharges a circulating flow of hydraulic fluid and the torque converter turbine 13 is driven by the momentum of the circulating flow to transmit a driving force to the shaft 14 of the torque converter turbine 13. Thus, a difference exists between the rotation of the torque converter pump 12 and the rotation of the torque converter turbine 13 and the rotating force is transmitted with such a rotational difference. With a small rotational difference, a small torque is transmitted, while with a large rotational difference, a large torque is transmitted. The torque converter 10 thus has a function of transmitting a varying rotational force.

A hydraulic pump 17 which may be a gear pump is directly connected to the pump shaft 11 for a purpose which will be described later. The front clutch 20 is composed of a clutch drum 21 connected integrally with the turbine shaft 14, a multiple disc clutch 22, a clutch piston 23, a spring plate 24 and a clutch shaft 25. When an actuating hydraulic pressure is applied thereto, the front clutch 20 acts to couple the shaft 14 of the torque converter turbine 13 to the clutch shaft 25.

The rear clutch 30 is composed of a clutch shaft 35 connected integrally with the clutch drum 21, a clutch drum 31, a multiple disc clutch 32, a clutch piston 33 and a spring plate 34. When an actuating hydraulic pressure is applied thereto, the rear clutch 30 acts to couple the clutch drum 21 to the clutch drum 31.

Figure 2:
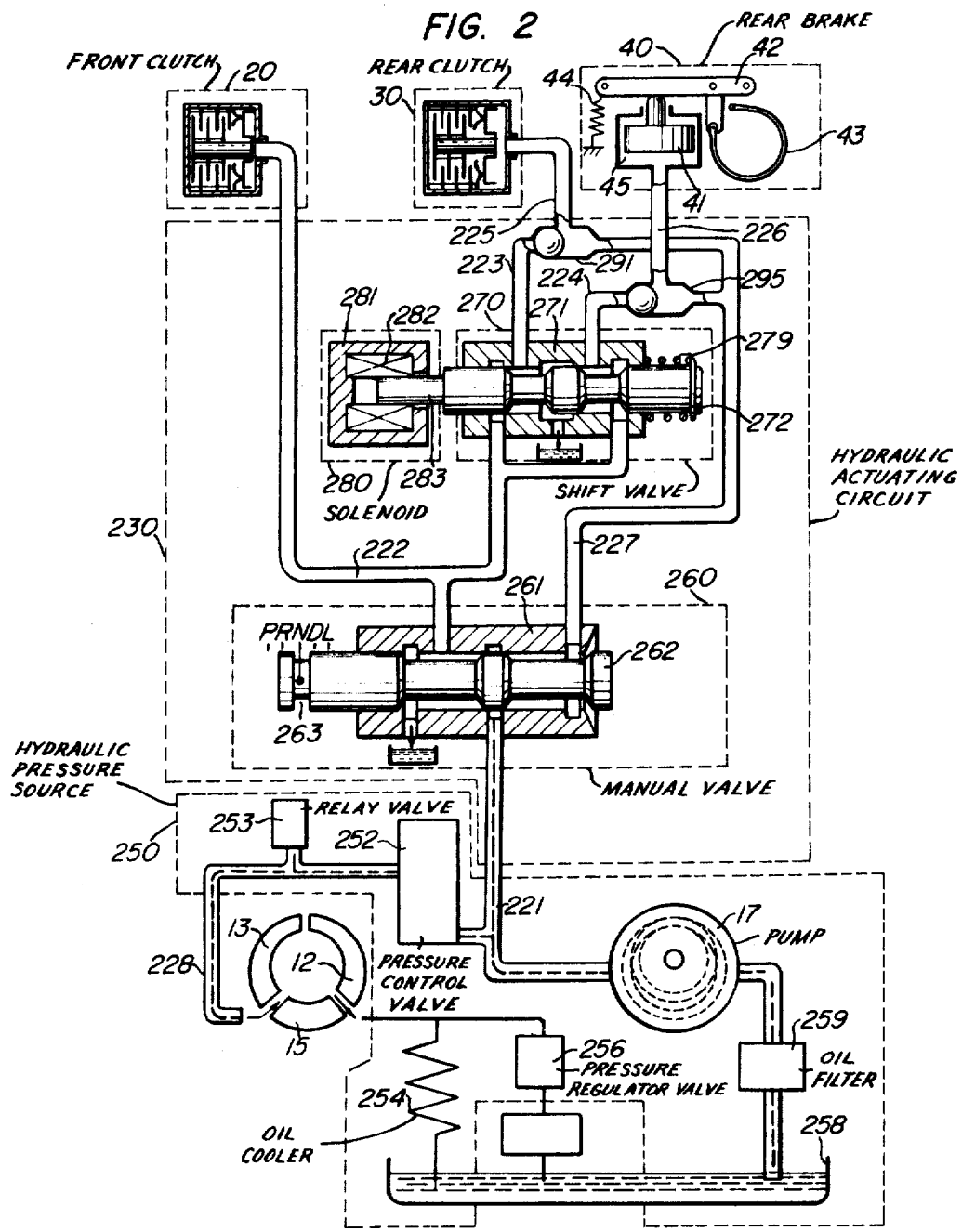

As shown in FIG. 2, the rear brake 40 is composed of a brake piston 41, a brake link 42, a brake band 43, a return spring 44 and a brake cylinder 45. When an actuating hydraulic pressure is applied thereto, the brake band 43 is actuated to lock a carrier 58 of the gear train 50 against any rotation relative to the housing 18.

These clutches and the brake are similar to those well known in the art. The gear train 50 is composed of, for example, a first sun gear 51, a second sun gear 57, a third sun gear 55, first planetary gears 52, second planetary gears 54, an output shaft 56 and a carrier 58. That is, the gear train 50 is in the form of a planetary bevel gear mechanism in which the first sun gear 51 and the second sun gear 57 are disposed opposite to each other to mesh with each other through the first planetary gears 52, and the second planetary gears 54 are integral with the first planetary gears 52 so as to mesh with the third sun gear 55. The planetary bevel gear mechanism takes the following variable speed meshing positions: In high gear, the front clutch 20 and the rear clutch 30 are actuated so that the first sun gear 51 and the second sun gear 57 rotate at the same number of revolutions. In this state, since the carrier 58 is idle, the output shaft 56 is rotated at the same number of revolutions of the two sun gears 51 and 57 and thus rotation is transmitted in a 1 : 1 relation, as is apparent from FIG. 1. In low gear, the front clutch 20 and the rear brake 40 are actuated so that rotation at the number of revolutions of the input shaft is imparted to the first sun gear 51, and since the carrier 58 is locked by the rear brake 40 and the second sun gear 57 is idly rotating, the output shaft 56 is rotated at a number of revolutions which is 1/K of the number of revolutions of the input shaft. Here, K is the speed changing ratio or reduction ratio of the gears. When reversing, the rear clutch 30 and the rear brake 40 are actuated so that the rotation of the input shaft is imparted to the second sun gear 57, and since the first sun gear 51 is idly rotating and the carrier 58 is locked by the rear brake 40, the output shaft 56 is rotated in the reverse direction at a number of revolutions which is 1/L of the number of revolutions of the input shaft.

REVOLUTION DETECTING MEANS

Means 70 for detecting the number of revolutions of the output shaft 56 comprises a revolution detector 71 mounted on the housing 18 and a toothed disc 72 integrally connected with the output shaft 56. Suppose that the number of teeth of the toothed disc 72 is n, for example, $n = 32$, then the revolution detector 71 detects an electrical signal S having a frequency which is $n$ times the number of revolutions N of the output shaft 56. Thus, $S = nN$.

Knowing the number of revolutions N of the output shaft 56 enables the speed of the vehicle to be known. The structure of the means 70 for detecting the number of revolutions N of the output shaft 56 will be described with reference to FIGS. 9a and 9b. As seen in a side elevation in FIG. 9a, the toothed disc 72 which is secured at its center of rotation to the output shaft 56 is a discal plate of magnetic material having 32 equally spaced teeth formed along its circumference, and the revolution detector 71 is mounted on the housing 18 at a position closely adjacent to the toothed disc 72 in the diametral direction of the latter. The revolution detector 71 is composed of a permanent magnet 101 and a coil 102 wound around the magnet 101. The permanent magnet 101 and the coil 102 are housed in a suitable casing of nonmagnetic material and the casing is mounted on the housing 18 of the transmission unit so that one end of the permanent magnet 101 is disposed in close proximity to the outer periphery of the toothed disc 72. As the tooth portion of the toothed disc 72 passes through the magnetic field of the permanent magnet 101 as a result of rotation of the toothed disc 72, a variation takes place in the leakage flux of the permanent magnet 101 so that an electromotive force is produced in the coil 102. In the case of the illustrated example, one complete rotation of the toothed disc 72 produces 32 voltage pulses. As described previously, a voltage signal at an A.C. voltage S having a frequency $n \times N$ is commonly obtained when the toothed disc 72 having n teeth rotates at a number of revolutions N per unit time. The voltage signal appears across output terminals 103. It will be apparent for those skilled in the art that the detection of the speed of the vehicle may be attained by mounting a small-sized generator in coaxial relation with the driven gear connected to the speed meter by a cable and detecting the output from the generator.

It is the second feature of the present invention that the number of revolutions described above is detected as an electrical signal and a speed changing instruction is issued to a hydraulic actuating circuit 230 shown in FIGS. 2 to 5 according to a present speed changing pattern so as to change the gear ratio of the gear train 50 by the operation of the hydraulic actuating circuit 230.

HYDRAULIC ACTUATING SYSTEM

The structure of the hydraulic actuating system preferably used in the two-forward speed automatic transmission system is shown in FIGS. 2, 3, 4 and 5. Briefly, the hydraulic actuating system comprises a hydraulic pressure source 250 and a hydraulic actuating circuit 230. The hydraulic actuating circuit 230 includes a manual valve 260, a select or shift valve 270, a solenoid 280, check valves 291 and 295, and hydraulic fluid or oil passages. The hydraulic pressure source 250 includes the hydraulic pump 17, an oil filter 259, an oil pan 258, a pressure regulating valve 256, a pressure control valve 252, a relief valve 253, an oil cooler 254, and hydraulic fluid or oil passages. The hydraulic pressure source 250 functions to supply oil under pressure to the torque converter 10, to the gears 50 for lubricating same and to the hydraulic actuating circuit 230. (No description will be given herein as to the operation of the hydraulic pressure source 250 as it is well known in the art.) The manual valve 260 is composed of a valve spool 262 and a valve casing 261. The valve spool 262 is adapted for interlocking operations with a control lever (not shown) disposed adjacent to the driver's seat so that it takes a corresponding position in response to urging of the control lever to one of the P (parking), R (reverse), N (neutral), D (drive) and L (low gear) positions. Symbols P, R, N, D and L shown in FIG. 2 represent the corresponding positions of the valve spool 262 which is moved in relation therewith. A groove 263 formed near the left-hand end of the valve spool 262 is adapted to receive therein a link connected to the control lever.

Figure 3:
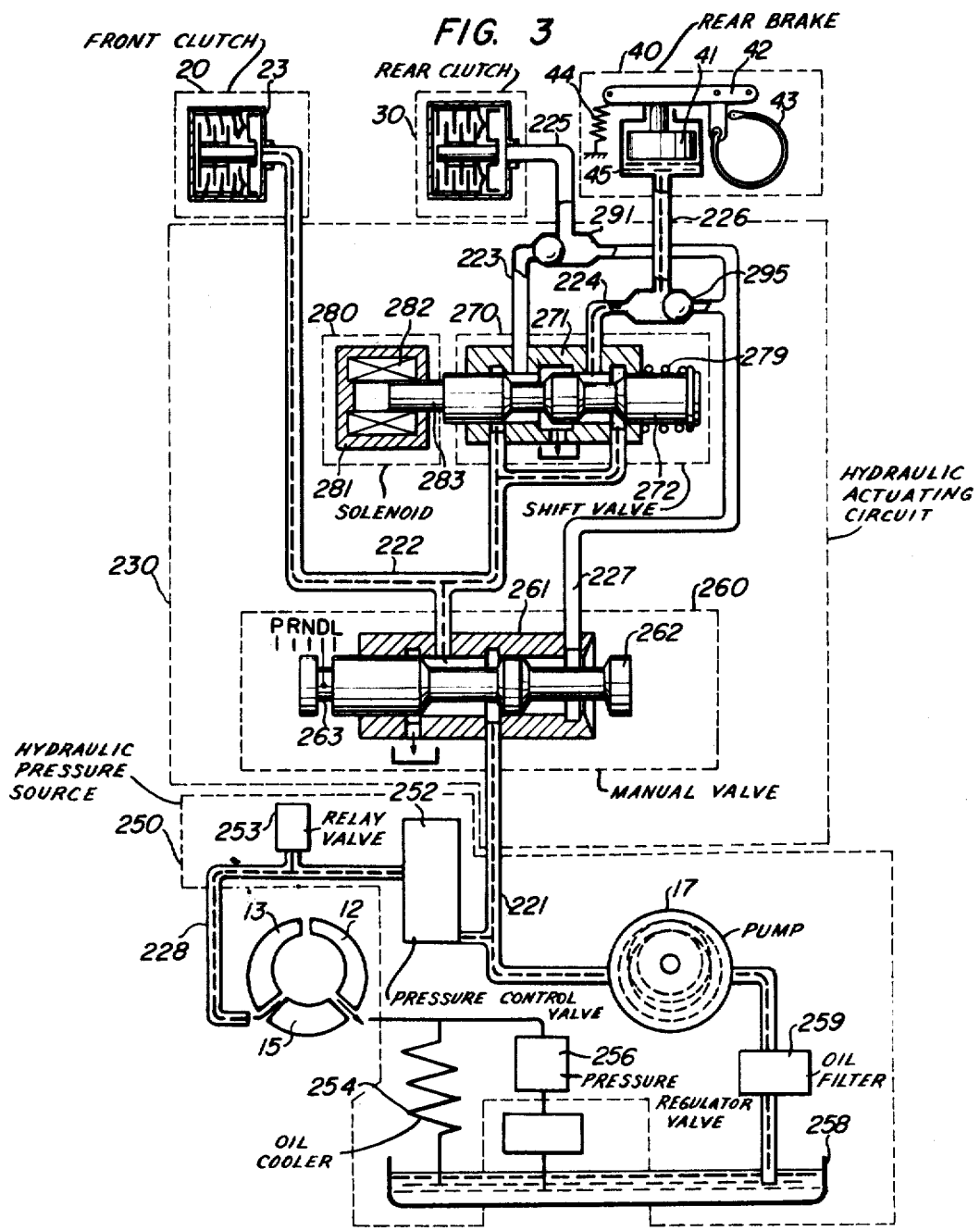

Suppose now that the manual valve 260 is in its N position, then as seen in FIG. 2, an oil passage 221 is closed and oil passages 222 and 227 are opened. When the manual valve 260 is urged to its L position, the oil passage 221 communicates with the oil passage 222 and the oil passage 227 is opened as in the state of the DL position shown in FIG. 3. However, an arrangement is made so that the solenoid 280 is in no way energized at the L position. When the manual valve 260 is urged to its D position or more precisely DL position, the oil passage 221 communicates with the oil passage 222 and the oil passage 227 is opened as seen in FIG. 3. The DL position turns to the DH position shown in FIG. 4 when the solenoid 280 is energized in the DL position in a manner as will be described later. When the manual valve 260 is urged to its R position, the oil passage 221 communicates with the oil passage 227 and the oil passage 222 is opened as seen in FIG. 5. When the manual valve 260 is urged to its P position, the oil passages 221 and 227 are closed and the oil passage 222 is opened.

The shift valve 270 includes a valve casing 271 and a valve spool 272. One end or left-hand end of the valve spool 272 is connected to a moving core 283 of the solenoid 280. When no current is supplied to the solenoid 280, the valve spool 272 is urged to its rightward position by the action of a spring 279 engaging the other or right-hand end of the valve spool 272 so that the oil passage 222 communicates with an oil passage 224 and an oil passage 223 is opened as seen in FIG. 3. When current is supplied to the solenoid 280, the valve spool 272 is urged leftward so that the oil passage 222 communicates with the oil passage 223 and the oil passage 224 is opened as seen in FIG. 4. When thus the actuating hydraulic pressure is supplied to the oil passage 223, the check valve 291 establishes communication between oil passages 223 and 225 and blocks the oil passage 227 as seen in FIG. 4. On the contrary, when the actuating hydraulic pressure is supplied to the oil passage 227, the check valve 291 establishes communication between the oil passages 227 and 225 and blocks the oil passage 223 as seen in FIG. 5. In response to the supply of the actuating hydraulic pressure to the oil passage 224, the check valve 295 establishes communication between oil passages 224 and 226 and blocks the oil passage 227 as seen in FIG. 3. On the other hand, in response to the supply of the actuating hydraulic pressure to the oil passage 227, the check valve 295 establishes communication between the oil passages 227 and 226 and blocks the oil passage 224 as seen in FIG. 5.

In the solenoid 280, the moving core 283 is attracted to move to the left while simultaneously moving the valve spool 272 of the shift valve 270 in that direction as seen in FIG. 4 when current is supplied to a coil 282. The moving core 283 is restored to its rightward position by the force of the spring 279 when the current supply is cut off as seen in FIG. 3. While the solenoid 280 is shown as a preferred electrical actuator in the illustrated embodiment, any other electrical actuator which converts an electrical signal into a mechanical displacement may be employed without departing from the spirit of the present invention.

The gear train 50 is placed in one of the N, D, L, R and P states by the action of the hydraulic elements described above. The detail of the operation will be described hereunder.

1 N State

As shown in FIG. 2, the actuating hydraulic pressure is interrupted by the manual valve 260 and all the actuators including the front clutch 20, rear clutch 30 and rear brake 40 are in their released position and are not in operation. Therefore, the shaft 14 of the torque converter turbine 13 can freely rotate. That is, the vehicle is at rest. In FIG. 2, those oil passages illustrated with thick broken lines are applied with the actuating hydraulic pressure.

2. D State

The D state involves two states, that is, the DL state and the DH state. More precisely, the DL state indicates the state of low gear, while the DH state indicates the state of high gear in the D state.

In the DL state, the valve spool 272 of the shift valve 270 takes its rightward position and the valve spool 262 of the manual valve 260 is in its D position as seen in FIG. 3. The actuating hydraulic pressure is supplied to the oil passages 221, 222, 224 and 226 so as to apply pressure to the front clutch 20 and rear brake 40, and the rear clutch 30 is released to be put in low gear.

In the DH state, the valve spool 262 of the manual valve 260 is in its D position and the valve spool 272 of the shift valve 270 takes its leftward position (due to the current supplied to the solenoid 280) as seen in FIG. 4. The actuating hydraulic pressure is supplied to the oil passages 221, 222, 223 and 225 so as to apply pressure to the front clutch 20 and rear clutch 30, and the rear brake 40 is released to put the gear train 50 in high gear.

3. L State

In the L state, the valve spool 262 of the manual valve 260 is placed in its L position and the valve spool 272 of the shift valve 270 takes its rightward position. The actuating hydraulic pressure is supplied to the same oil passages as those in FIG. 3 so as to apply pressure to the front clutch 20 and rear brake 40, and the rear clutch 30 is released to put the gear train 50 in low gear.

4. R State

As seen in FIG. 5, the valve spool 262 of the manual valve 260 is placed in its R position and the valve spool 272 of the shift valve 270 takes its rightward position. The actuating hydraulic pressure is supplied to the rear clutch 30 and rear brake 40 by way of the oil passages 221, 227, 225 and 226, and the front clutch 20 is released to set up the R state.

5. P State

In the P state, the valve spool 262 of the manual valve 260 is placed in its P position and the valve spool 272 of the shift valve 270 takes its rightward position. As in the case of the N state shown in FIG. 2, the actuating hydraulic pressure in interrupted by the valve spool 262 with the result that all the actuators are in their released position. Although not shown, a parking device which operates in response to the P position of the manual valve 260 acts to mechanically fix the output shaft 56 against any rotation as is commonly known in the art.

The speed change between DH and DL in the D state is automatically carried out by energization or de-energization of the solenoid 280. The region of speed change for energizing or de-energizing the solenoid 280 at this speed changing point will next be described.

SPEED CHANGING REGION

The present invention is similar to prior art transmission systems in that the operating state of the engine is given by the throttle valve opening $S_\theta$ in the carburetor and the running state of the vehicle is given by the number of revolutions N of the output shaft 56 as previously described. Thus, the speed changing point required for the vehicle is determined from the magnitudes of these factors.

1. Restriction on the Number of Revolutions of the Engine

An internal combustion engine has general difficulty in maintaining smooth rotation at a number of revolutions below a certain limit. It is therefore undesirable to shift from low to high gear at an extremely small number of revolutions. Thus, the gear must be shifted at a number of revolutions above a minimum value which is peculiar to the specific engine. In other words, the speed changing region should lie above a specific number of revolutions. (In this case, the speed changing region includes a lower limit which is dependent upon the performance of the engine.) Conversely, when shifting gear from high to low gear, it is desirable that the vehicle continues to run in high gear until the smallest possible number of revolutions in high gear is substantially reached. Thus, the speed changing region in such a case should lie below a number of revolutions which is not so large. (In this case, the speed changing region includes an upper limit which is dependent on the performance of the engine.)

2. Restriction on Speed of Vehicle

In shifting gear from low to high gear in a vehicle, especially an automobile, it is undesirable to run the vehicle in high gear at an extremely low speed because the acceleration and deceleration by the accelerator pedal can not be effected as desired. Therefore, the speed changing region in this case should lie above a vehicle speed which is not so low. (In this case, the speed changing region includes a lower limit which is dependent on the performance of the vehicle.) Conversely, in shifting gear from high to low gear, it is desirable that the transmission is kept in high gear until a lowest possible vehicle speed that can be run with high gear is reached because undesirable noises and vibrations are generally developed in low gear. Thus, in this case, the speed changing region should lie below a vehicle speed which is not so high. (In this case, the speed changing region has an upper limit which is dependent on the performance of the vehicle.)

3. Relation Between Throttle Valve Opening and Vehicle Speed

Figure 6A:
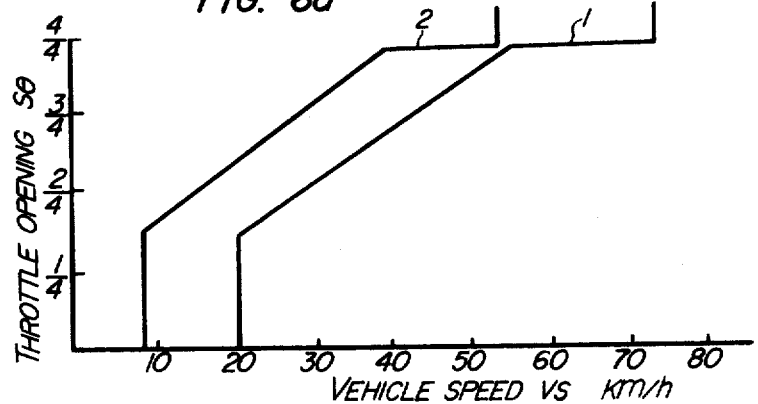
FIGS. 6a and 6b are graphs showing one example of a general speed changing region.

The point at which the gear is shifted from high to low gear and from low to high gear is referred to as the speed changing point (line). The speed changing point (line) is determined by the vehicle speed and the opening of the throttle valve in the carburetor. FIG. 6a shows the speed changing points determined from the above factors. In FIG. 6a, the vertical axis represents the opening $S_\theta$ of the throttle valve and the horizontal axis represents the vehicle speed $V_S$. With the throttle valve opening of up to approximately ¼ of the full opening, the vehicle speed at the speed changing point (line) in the case of up-shift 1 (shifting from low to high gear) and at the speed changing point (line) in the case of down-shift 2 (shifting from high to low gear) has a fixed value as is apparent from the restriction on the vehicle speed described above and is substantially independent of the opening of the throttle valve. As the opening of the throttle valve exceeds ¼ and is further increased, the speed changing point moves successively toward the high speed side. As the opening of the throttle valve is increased to a point near 4/4 or full opening, the speed changing point moves abruptly to the high speed side and any further increase in the throttle valve opening does not change the vehicle speed at the speed changing point so that the vehicle runs at a fixed speed. That is, the vehicle cannot run in low gear at a speed higher than 70 to 80 kilometers per hour as is apparent from the restriction on the number of revolutions of the engine described above. A hysteresis is seen between the speed changing point (line) in the case of the up-shift 1 and the speed changing point (line) in the case of the down-shift 2. The hysteresis is necessary in order to prevent frequent gear shifting when the vehicle runs at a speed in the vicinity of the speed changing point (line) and thus to avoid unstable running.

It will be apparent from FIG. 6a that, when an abrupt acceleration is required during running in high gear at a vehicle speed less than 50 to 60 kilometers per hour, the accelerator pedal may be kicked down so that the gear is downshifted beyond the speed changing point (line) to be put in low gear, and thus the required acceleration can be obtained. After attaining the desired acceleration, the depression pressure on the accelerator pedal may slightly be released to bring the gear position in high gear again. When the vehicle speed is higher than 50 to 60 kilometers per hour, kick-down of the accelerator pedal cannot attain the down-shift from high gear to low gear.

Figure 6B:
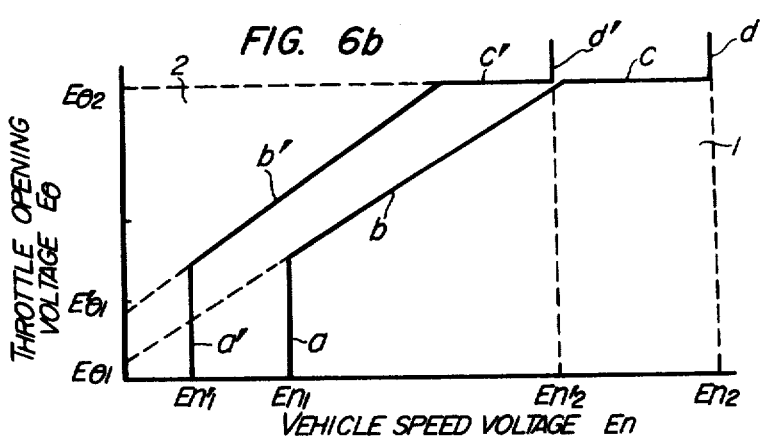

The speed change diagram of the electronic control device shown in FIG. 6b is similar to the speed change diagram shown in FIG. 6a. More precisely, in FIG. 6b, the vertical axis represents the voltage $E_\theta$ which is proportional to the opening of the throttle valve and the horizontal axis represents the voltage $E_n$ which is proportional to the speed of the vehicle. In the case of the up-shift, the speed is changed when these voltages make a shift to a region 1 defined by lines $a$, $b$, $c$ and $d$, while in the case of the down-shift, the speed is changed when these voltages make a shift to a region 2 defined by $a'$, $b'$, $c'$ and $d'$. Suppose that the lines $a$, $b$, $c$ and $d$ are expressed by the respective equations $E_n = E_{n1}$, $E_\theta = LE_n + E_{\theta 1}$, $E_\theta = E_{\theta 2}$, and $E_n = E_{n2}$. Then, a shift from low to high gear takes places when the conditions $E_{n1} < E_n$, $E_\theta < kE_n + E_{\theta 1}$, $E_\theta < E_{\theta 2}$ and $E_{n2} < E_n$ are satisfied. Suppose further that the lines $a'$, $b'$, $c'$ and $d'$ are expressed by the respective equations $E_n = E_{n1}'$, $E_\theta = L'E_n + E_\theta'$, $E_\theta = E_{\theta 2}$ and $E_n = E_{n2}'$. Then, a shift from high to low gear takes place when the conditions $E_{n1}' > E_n$, $E_\theta > k'E_n + E_{\theta 1}'$ and $E_\theta > E_{\theta 2}'$, $E_n < E_{n2}'$ are satisfied. An electronic control device for controlling the above conditions will have a very complex structure.

Figure 7:
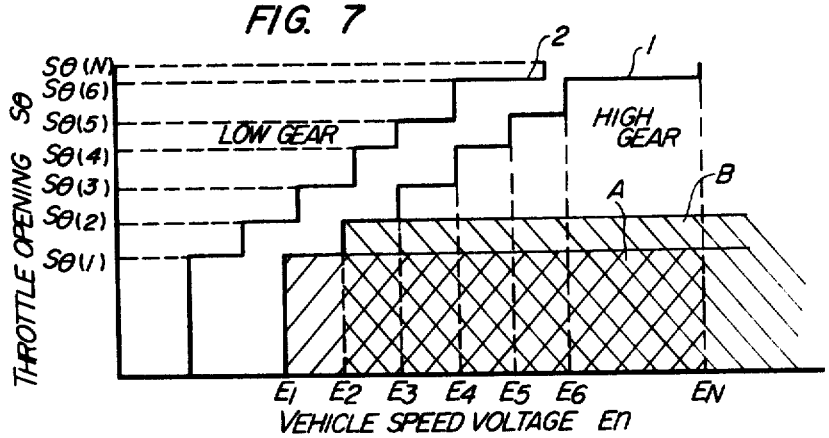
FIG. 7 is a graph showing how the speed changing region shown in FIGS. 6a and 6b is approximated by stepped lines having a plurality of break points.
Figure 8:
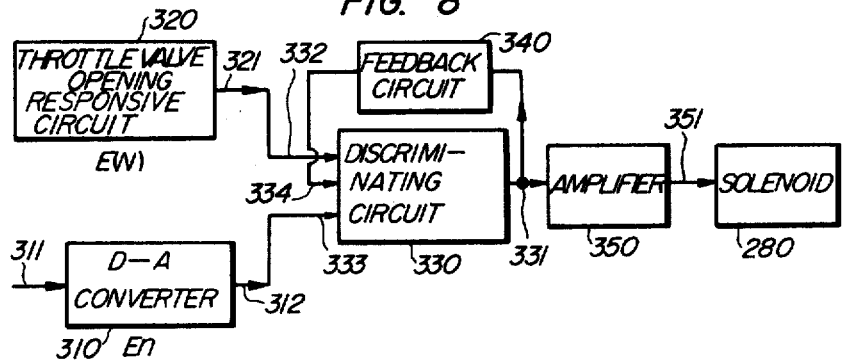
FIG. 8 is a block diagram showing the structure of an electronic control device preferably used in the embodiment of the present invention.

It is the most important feature of the present invention to simplify the structure of such a device. According to the present invention, the inclined lines shown in FIG. 6a are approximated by stepped lines having a plurality of break points as shown in FIG. 7. The line 1 in FIG. 7 represents the speed changing point (line) from low to high gear, while the line 2 represents the speed changing point (line) from high to low gear. By the above manner of approximation, the electronic control device has a very simple structure as seen in FIG. 8. In the diagram shown in FIG. 7, the vertical axis represents the opening S of the throttle valve, and the speed changing point (line) 1 has a plurality of steps corresponding to the openings $S_{\theta(1)}$, $S_{\theta(2)}$, - - - , $S_{\theta(N)}$ (N is a positive integer) of the throttle valve. The horizontal axis represents the voltage $E_n$ which is proportional to the speed of the vehicle, and it is supposed that voltages $E_1$, $E_2$, - - -, $E_N$ (N is a positive integer) are proportional to the vehicle speeds corresponding to the respective openings $S_{\theta(1)}$, $S_{\theta(2)}$, - - -, $S_{\theta(N)}$ of the throttle valve. Here, $S_{\theta(1)}$, $S_{\theta(2)}$ - - -, $S_{\theta(N)}$ and $E_1$, $E_2$, - - -, $E_N$ are constants which are determined depending on the speed changing pattern shown in FIG. 7.

The conditions that the opening $S_\theta$ of the throttle valve is $S_{\theta(1)}$ and the voltage $E_n$ proportional to the vehicle speed is larger than $E_1$ or $E_n > E_1$ are satisfied in a region A. The conditions $S_\theta = S_{\theta(2)}$ and $E_n > E_2$ are satisfied in a region B. Thus, regions satisfying the conditions $S_\theta = S_{\theta(3)}$ and $E_n > E_3$, - - -, $S_\theta = S_{\theta(N)}$ and $E_n > E_N$ move successively toward the high gear side. In other words, the conditions $E_n = E_1$, $E_n = E_2$, - - -, $E_n = E_N$ corresponding to $S_\theta = S_{\theta(1)}$, $S_\theta = S_{\theta(2)}$, - - -, $S_\theta = S_{\theta(N)}$ are satisfied at the speed changing point (line) 1 for the up-shift. On the other hand, the speed changing point (line) 2 for the down-shift can be obtained by feeding back the output from a discriminating circuit in FIG. 8 to the input thereof through a feedback circuit. One form of the electronic control device for carrying out the speed change on the basis of the speed changing points (lines) 1 and 2 shown in FIG. 7 will next be described.

CONTROL DEVICE

Referring to FIG. 8, the control device for controlling the speed change comprises a D – A converter 310, a throttle valve opening responsive circuit 320, a discriminating circuit 330, a feedback circuit 340, an amplifier 350 and the solenoid 280. The control device is placed in an operative state capable of controlling as it is connected to an electrical power source by a switch (not shown) when the control lever associated with the hydraulic actuating circuit is set at its D position.

The output voltage signal S from the means 70 for detecting the number of revolutions of the output shaft 56 is supplied to the D – A converter 310 by way of a lead 311. The D – A converter 310 delivers an electrical signal E representative of the number of revolutions of the output shaft 56 by way of a lead 312. The throttle valve opening responsive circuit 320 delivers an output signal $E_{(1)}$, $E_{(2)}$, - - - or $E_{(N)}$ corresponding to the opening $S_{\theta(1)}$, $S_{\theta(2)}$, - - - or $S_{\theta(N)}$ of the throttle valve in the carburetor. The output signal appears on a lead 321. The leads 312 and 321 and an output lead from the feedback circuit 340 are connected to respective input terminals 333, 332 and 334 of the discriminating circuit 330. In the discriminating circuit 330, $E_n$ is compared with $E_{(N)}$ and an output signal "1", for example, is delivered therefrom when $E_n > E_{(N)}$. When $E_n \leq E_{(N)}$, an output signal which is opponent to the signal in the case of $E_n > E_{(N)}$ is delivered. The feedback circuit 340 receives the output signal from the discriminating circuit 330 appearing on a lead 331 and feeds back such a signal to the input 334 of the discriminating circuit 330. The voltage signal from the discriminating circuit 330 is supplied to the amplifier 350 by the lead 331 and an output voltage signal is delivered from the amplifier 350 by way of a lead 351. The lead 351 is connected to the solenoid 280 so that the output signal from the amplifier 350 is supplied to the solenoid 280 to energize the latter.

Figure 10:
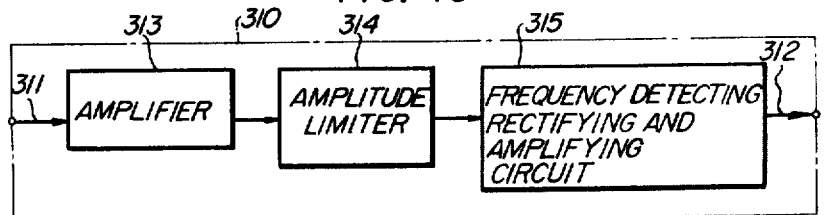
FIG. 10 is a block diagram showing the structure of a D – A converter in the device shown in FIG. 8.
Figure 11A:
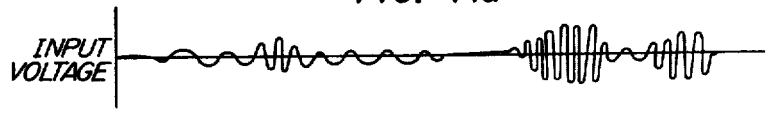
FIGS. 11a, 11b and 11c are graphic illustrations of the operating voltage waveforms appearing in the D – A converter shown in FIG. 10.
Figure 11B:
Figure 11C:
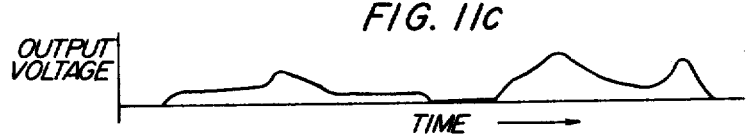

The D – A converter 310 converts the A.C. signal or digital signal S into a D.C. voltage signal or analog signal. The D – A converter 310 has a structure as shown in FIG. 10. The input voltage signal S is supplied through the lead 311 to an amplifier 313 in which the amplitude of the signal is increased. An amplitude limiter 314 limits the amplitude of the signal to a fixed value. A frequency detecting, rectifying and amplifying circuit 315 converts the A.C. voltage into a D.C. voltage which is then led out by way of the lead 312. The voltage waveforms appearing in the circuit 310 are shown in FIGS. 11a to 11c. FIG. 11a shows the waveform of the voltage S and the same waveform is maintained even after the amplification of same. FIG. 11b shows the waveform of the output from the amplitude limiter 314. FIG. 11c shows the waveform of the output $E_n$ from the frequency detecting, rectifying and amplifying circuit 315, and the output $E_n$ is an analog voltage proportional to the number of revolutions of the output shaft 56.

Figure 12:
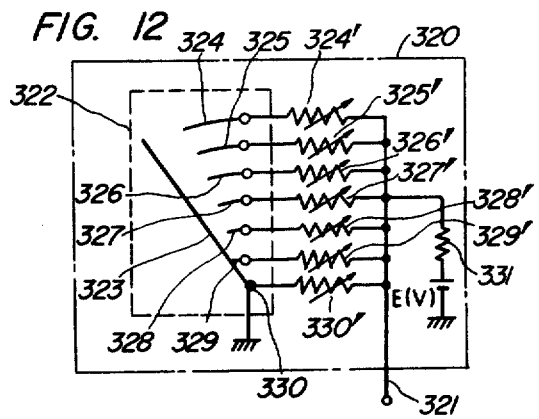
FIG. 12 is a circuit diagram showing the structure of a throttle valve opening responsive circuit in the device shown in FIG. 8.

The throttle valve opening responsive circuit 320 has a structure as shown in FIG. 12. The reference numeral 322 designates a multi-contact switch which is responsive to the position of the throttle valve in the carburetor and has a movable contact 323 and a plurality of stationary contacts 324, 325, 326, 327, 328 and 329. The switch 322 is so constructed that the movable contact 323 is successively released from contact with the stationary contacts 324, 325, 326, 327, 328 and 329 as the opening $S_\theta$ of the throttle valve is successively increased to $S_{\theta(1)}$, $S_{\theta(2)}$, $S_{\theta(3)}$, $S_{\theta(4)}$, $S_{\theta(5)}$ and $S_{\theta(6)}$. The movable contact 323 is grounded. The stationary contacts 324, 325, 326, 327, 328 and 329 are connected at one end to respective variable resistors 324', 325', 326', 327', 328' and 329', and one end of a variable resistor 33' is grounded. The variable resistors 324' through 330' are connected at the other end in common to the lead 321. A resistor 331' is connected at one end to the lead 321, and a fixed voltage $E_r$ is applied to the other end of the resistor 331'. The variable resistor 330' is so adjusted that the voltage $E_{(7)}$ appears on the lead 321 when $S_\theta = S_{\theta(7)}$ due to the full opening of the throttle valve in the carburetor. Then, when the throttle valve opening $S_\theta$ is reduced to $S_{\theta(6)}$, the movable contact 323 engages solely with the stationary contact 329. The variable resistor 329' is so adjusted that the output appearing on the lead 321 in such a position of the switch 322 is given by $$\frac{R_6//R_7}{R_6//R_7 + R} \cdot E = E_{(6)}$$

where R, $R_6$ and $R_7$ are the resistances of the resistor 331, variable resistor 329' and variable resistor 330', respectively, and $R_6//R_7$ is the resistance given when the variable resistors 329' and 330' are connected in the circuit in parallel with each other. The variable resistor 328' is so adjusted that the output $E_{(5)}$ appearing on the lead 321 in response to the throttle valve opening of $S_{\theta(5)}$ is given by $$\frac{R_7//R_6//R_5}{R_7//R_6//R_5 + R} \cdot E = E_{(5)}$$

where $R_5$ is the resistance of the variable resistor 328'. Similarly, the variable resistors 327', 326', 325' and 324' are so adjusted that the outputs appearing on the lead 321 in response to the throttle valve openings of $S_{\theta(4)}$, $S_{\theta(3)}$, $S_{\theta(2)}$ and $S_{\theta(1)}$ are equal to $E_{(4)}$, $E_{(3)}$, $E_{(2)}$ and $E_{(1)}$, respectively. Thus, the voltages $E_{(1)}$, $E_{(2)}$, $E_{(3)}$, $E_{(4)}$, $E_{(5)}$, $E_{(6)}$ and $E_{(7)}$ appear on the lead 321 in response to the throttle valve opening $S_\theta$ of $S_{\theta(1)}$, $S_{\theta(2)}$, $S_{\theta(3)}$, $S_{\theta(4)}$, $S_{\theta(5)}$, $S_{\theta(6)}$ and $S_{\theta(7)}$, respectively. In other words, a stepped signal voltage $E_{(N)}$ (N = 1, 2, 3, 4, 5, 6, 7) is delivered to the lead 321 depending on the throttle valve opening. The switch 322 is shown as having six stationary contacts. It is apparent that the number of stationary contacts is as many as possible in order to attain a better approximation because the speed changing points (lines) in FIG. 6a can be approximated better by increasing the number of steps in the speed changing points (lines) shown in FIG. 7. However, in the present embodiment, the number of the stationary contacts is limited to six since the provision of more stationary contacts results in a higher cost.

Figure 13:
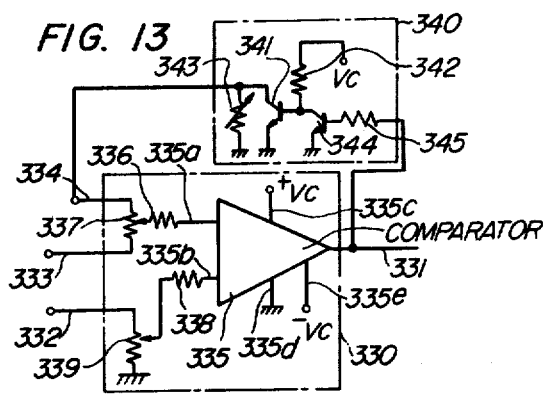
FIG. 13 is a circuit diagram showing the structure of a discriminating circuit and an associated feedback circuit in the device shown in FIG. 8.

The discriminating circuit 330 and the feedback circuit 340 have a structure as shown in FIG. 13. The discriminating circuit 330 includes a comparator 335 of the kind sold by the trade code name of μpc 71 by Nippon Electric Co., Ltd. or of SN72710N by Texas Instruments Co., Ltd. An input resistor 336 is connected at one end to an input terminal 335a of the comparison circuit 335 and at the other end to the movable arm of a variable resistor 337. The variable resistor 337 is connected across the input terminals 333 and 334 of the discriminating circuit 330. A resistor 338 is connected at one end to the movable arm of a variable resistor 339 and at the other end to an input terminal 335b of the comparison circuit 335. The variable resistor 339 is connected at one end to the input terminal 332 of the discriminating circuit 330 and is grounded at the other end. Terminals 335c, 335d and 335e of the comparison circuit 335 connect the circuit 335 to the positive terminal of a power source, to ground and to the negative terminal of the power source, respectively. An NPN transistor 341 has its emitter grounded, and its base connected to one end of a resistor 342 and the collector of another NPN transistor 344. The other end of the said resistor 342 is connected to the voltage source of $V_C$ (V). The base of the transistor 344 is connected to the output lead 331 of the comparator 330 through a resistor 345, while the emitter of the same transistor is grounded.

In operation, assuming that no voltage or "0" appears on the output lead 331 when no signal is applied to the input terminals 332, 333 and 334, the transistor 344 of the feedback circuit 340 is non-conducting, accordingly the transistor 341 being conducting, thus the input terminal 334 of the comparator circuit 330 is grounded. When a signal $E_{(N)}$ (N = 1, 2, 3, ...) and a signal $E_n$ are applied to the respective input terminals 332 and 333 of the discriminating circuit 330, a voltage $$E_n' = \frac{R_b}{R_a + R_b} \cdot E_n$$

appears at the movable arm of the variable resistor 337, where $R_a$ is the resistance between the input terminal 333 and the movable arm of the variable resistor 337, $R_b$ is the resistance between the movable arm of the variable resistor 337 and the collector of the transistor 341 in the feedback circuit 340, and $R_c$ is the resistance of the variable resistor 343. A voltage $E_{(N)}'$ appears at the movable arm of the variable resistor 339 and is given by $$E_{(N)}' = \frac{R_e}{R_d + R_e} \cdot E_{(N)}$$

where $R_d$ is the resistance between the movable arm of the variable resistor 339 and the input terminal 332, and $R_e$ is the resistance between the movable arm and ground.

The voltage $E_n'$ is applied to the terminal 335a through the resistor 336, and the voltage $E_{(N)}'$ is applied to the terminal 335b through the resistor 338. The comparison circuit 335 compares $E_{(N)}'$ with $E_n'$. When $E_n' - E_{(N)}'$ is positive "1" is delivered from the comparison circuit 335 to appear on the lead 331, while when $E_n' - E_{(N)}'$ is negative, "0" or no output signal is delivered from the comparison circuit 335. Since $$E_n' - E_{(N)}' = \frac{R_b}{R_a + R_b} \cdot E_n - \frac{R_e}{R_d + R_e} \cdot E_{(N)}$$

the variable resistors 337 and 339 may be so adjusted that $R_b/R_a + R_b = R_e/R_d + R_e = a$ thereby to give the relation $E_n' - E_{(N)}' = aE_n - aE_{(N)}$. Consequently, comparison of $E_{(N)}'$ with $E_n'$ whether $E_n' - E_{(N)}'$ is positive or negative is equivalent to comparison of $E_{(N)}$ with $E_n$ whether $E_n - E_{(N)}$ is positive or negative. The resistors 336 and 338 are protective resistors which protect the comparison circuit 335 from large inputs that may be applied to the input terminals. The comparison circuit 335 may be composed of a differential amplifying circuit and a Zener diode or a Schmitt circuit.

When "1" or an output voltage appears on the output lead 331 of the discriminating circuit 330 due to $E_n' - E_{(N)}' > 0$, base current is supplied to the base of the transistor 344 through the resistor 345 in the feedback circuit 340 to turn on the transistor 344 and accordingly to turn off the transistor 341. Therefore, since the resistance of the variable resistor 343 is $R_c$, the potential at the movable arms of variable resistor 337 is given by $$E_n'' = \frac{R_b + R_c}{R_a + R_b + R_c} \cdot E_n$$

On the other hand, "0" is delivered from the comparator 335 to appear on the output lead 331 as $E_n$ is gradually decreased. This occurs not when $E_n' - E_{(N)}' \leq 0$ but when $E_n' + M - E_{(N)}' \leq 0$ where M is a constant given by $$E_n'' - E_n' = \frac{R_b + R_c}{R_a + R_b + R_c} \cdot E_n - \frac{R_b}{R_a + R_b} \cdot E_n = M$$

This means that "0" is delivered when $E_n + M/a - E_{(N)} \leq 0$. It will thus be understood that "1" appears on the output lead 331 of the discriminating circuit 330 when $E_n$ is so large as to give the relation $E_n > E_{(N)}$, and "0" appears on the output lead 331 when $E_n$ is decreased to give the relation $E_n + M/a - E_{(N)} \leq 0$ instead of the relation $E_n - E_{(N)} \leq 0$. This is shown in FIG. 7 in which it will be seen that the speed changing point (line) 1 is transferred by M/a in the left-hand direction along the horizontal axis $E_n$ to give the speed changing point (line) 2. The feedback circuit 340 acts to carry out the above operation of parallelly transferring the speed changing point (line) by M/a.

The amplifier 350 is a conventional one, and its sole function is amplification of the output signal from the discriminating circuit 330 for energizing the solenoid 280. The amplifier 350 is unnecessary when the output signal from the discriminating circuit 330 can satisfactorily energize the solenoid 280. The solenoid 280 is well known in the art and any description as to it will be unnecessary. It is apparent that an alternative circuit arrangement may be employed so that "1" is delivered from the discriminating circuit 330 to appear on the output lead 331 when $E_n - E_{(N)} < 0$, while "0" appears on the output lead 331 when $E_n - E_{(N)} > 0$ and the solenoid 280 is energized in response to appearance of "0" on the output lead 331. Although the illustrated example refers to the case in which the feedback circuit 340 acts to vary the potential at the input terminal 335a, the same result can be obtained by varying the potential at the input terminal 335b in a manner contrary to the variation of the potential at the input terminal 335a.

The D – A converter 310 is a constructed that a gradually increasing positive voltage appears on the output lead 312 as the frequency supplied through the input lead 311, hence the speed of the vehicle is increased. The output lead 321 of the throttle valve opening responsive circuit 320 may be connected with the output lead 312 of the digital-analog conversion circuit 320, and the input terminal 332 of the discriminating circuit which has been connected with the output lead 321 of the throttle valve opening responsive circuit 320 may be connected to ground or to a source of fixed voltage to obtain a zero balance. The throttLE valve opening responsive circuit 320 may be so constructed that the resistance between the output thereof and ground is reduced as the opening of the throttle valve is increased. While the above description has referred solely to the case of applying positive signals to the two input terminals 332 and 333 of the discriminating circuit 330 for convenience of explanation, it is apparent that any other signals that can be compared with each other may be applied to these input terminals. It is also apparent from the previous description regarding the hydraulic actuating circuit that the gear is shifted to high gear when the solenoid 280 is energized and the gear is shifted to low gear when the solenoid 280 is de-energized.

While the present invention has been described with regard to a two-forward speed automatic transmission system, it will be easily understood that it is also applicable to a three-forward speed automatic transmission system or to a multi-speed automatic transmission system. In such a case too, arithmetic operation of the speed of the vehicle and arithmetic operation of the opening of the throttle valve may similarly be carried out and these signals may be used for energization or de-energization of a solenoid or solenoids to change over one or a plurality of shift valves (having a function the same as or similar to that of the shift valve 270) by means of one or a plurality of solenoids (having a function the same as or similar to that of the solenoid 280) so that the gear position can be changed from low to high gear, that is, from first gear to second, from second gear to third, and so on, and the gear position can be changed from high to low gear, that is, from second gear to first, from third gear to second, and so on. It is apparent that such a transmission system is also included in the scope of the present invention.

HYDRAULIC ACTUATING CIRCUIT OF THREE-FORWARD SPEED AUTOMATIC TRANSMISSION SYSTEM

A three-forward speed automatic transmission unit can be formed by affixing a front brake 60 to the clutch drum 31 of the rear clutch 30 in the two-forward speed automatic transmission unit shown in FIG. 1. Meshing engagement of gears for the three forward speeds can be attained by combining the front clutch 20, the rear clutch 30 and the rear brake 40 shown in FIG. 1 with the front brake 60 and actuating these elements in a manner as shown in the following table:

|  | Front clutch 20 | Rear clutch 30 | Front brake 60 | Rear brake 40 |
|---|---|---|---|---|
| Reverse, R | | | Actuated | Actuated |
| Forward: | | | | |
| First speed, L | | Actuated | | Do. |
| Second speed, DL | | do | Actuated | |
| Third speed, DH | | do | Actuated | |

A hydraulic actuating circuit preferably used in the automatic transmission unit of the kind described above is shown in FIG. 14. FIG. 14 shows the hydraulic actuating circuit in a position of the second speed (DL). A front clutch 20, a rear clutch 30 and a rear brake 40 shown therein are similar to those shown in FIGS. 1 and 2. A front brake 60 is composed of a brake piston 61, a brake link 62, a brake band 63, a return spring 64 and a brake cylinder 65. When an actuating hydraulic pressure is applied to the front brake, 60, the brake band 63 is actuated to fix the second sun gear 57 of the gear train 50 in position.

Referring to FIG. 14, an oil passage 221 leads to a manual valve 1260 and is divided into two branch passages. An oil passage 1222 leads out of the manual valve 1260 and is divided into two branch passages one of which communicates with a first shift valve 1270. An oil passage 1223 leads out of the first shift valve 1270 and is divided into two branch passages, one of which communicates directly with the brake cylinder 65 of the front brake 60, while the other communicates with a second shift valve 1290. An oil passage 1301 leads out of the second shift valve 1290 and is divided into two branch passages which communicate with the rear clutch 30 and the brake cylinder 65 of the front brake 60, respectively. The first shift valve 1270 is provided with a valve spool 1272 which is associated with a solenoid 1280. The second shift valve 1290 is provided with a valve spool 1292 which is associated with a solenoid 1300. A combination of energization of these two solenoids in a manner as shown in the following table accomplishes the meshing engagement of the gears for the 1st, second and third speeds:

|  | Solenoid 1280 | Solenoid 1300 |
|---|---|---|
| First speed | — | — |
| Second speed | Energized | — |
| Third speed | Energized | Energized |

Energization of the solenoid 1280 urges the valve spool 1272 of the first shift valve 1270 leftward in FIG. 14 thereby to provide communication between the oil passages 1222 and 1223. De-energization of the solenoid 1280 brings the valve spool 1272 back to the rightward position shown in FIG. 14 thereby to cut off communication between the oil passages 1222 and 1223 and to establish communication between the oil passages 1222 and 1227. The second shift valve 1290 cuts off communication between the oil passages 1223 and 1301 when its valve spool 1292 is in the position illustrated. Energization of the solenoid 1300 urges the valve spool 1292 leftward in FIG. 14 to provide communication between the oil passages 1223 and 1301.

The speed changing region and the structures of the control device when the present invention is applied to such a three-forward speed automatic transmission system will now be described.

SPEED CHANGING REGION OF THREE-FORWARD SPEED AUTOMATIC TRANSMISSION SYSTEM

Figure 15:
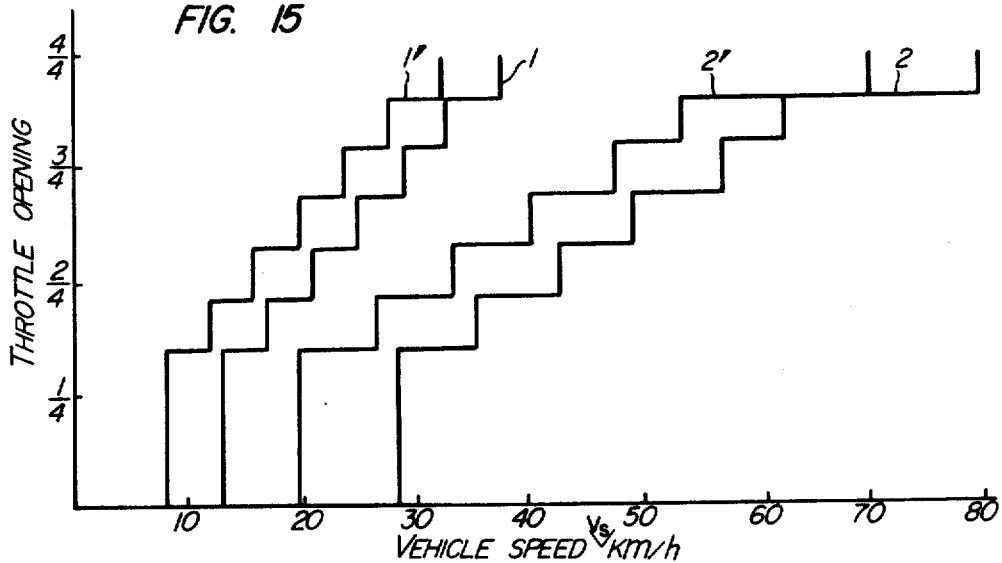
FIG. 15 is a graph showing one example of the speed changing region when the present invention is applied to such a three-forward speed automatic transmission system.

The speed changing region in the case of the three-forward speed automatic transmission system according to the present invention includes restrictions on the number of revolutions of the engine and on the speed of the vehicle as in the case of the two-forward speed automatic transmission system previously described. However, individual practical values differ from the previous values. One example of such values is shown in FIG. 15 in which the vertical axis represents the opening S of the throttle valve and the horizontal axis represents the speed of the vehicle $V_S$. In FIG. 15, the reference numerals 1, 1', 2 and 2' designate a speed changing point (line) from low to second gear, a speed changing point (line) from second to low gear, a speed changing point (line) from second to top gear, and a speed changing point (line) from top to second gear, respectively.

The control device includes an additional set of a discriminating circuit, a feedback circuit, an amplifier and a solenoid compared with the control device in the case of the two-forward speed automatic transmission system. Brief description will be given as to the structure and operation of the control device with reference to FIGS. 16 and 17.

Figure 9A:
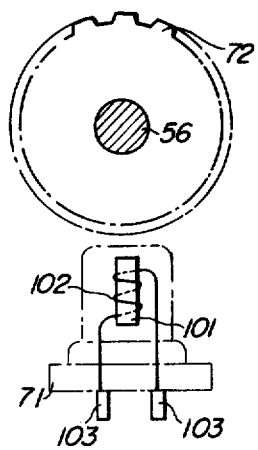
FIGS. 9a and 9b are a side elevational view and a front elevational view, respectively, of a revolution detecting means preferably used in the system.
Figure 9B:
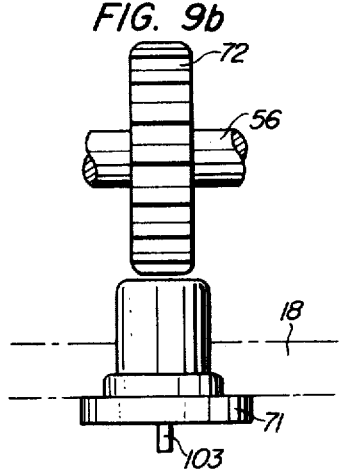
Figure 16:
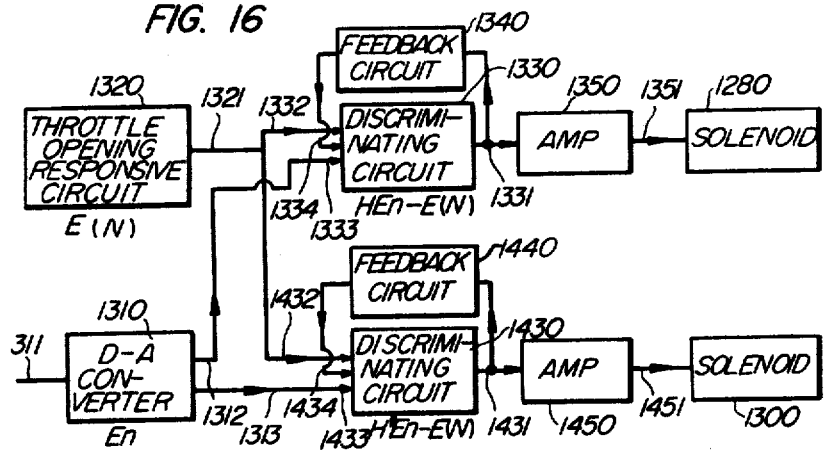
FIG. 16 is a block diagram of an electronic control device preferably used in the three-forward speed automatic transmission system.
Figure 17:
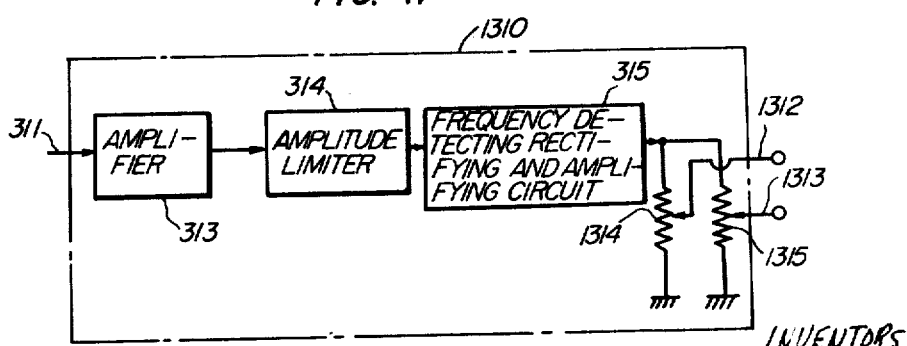
FIG. 17 is a block diagram showing the structure of a digital-analog conversion circuit preferably used in the device shown in FIG. 16.

The control device for determining the speed changing point (line) of the three-forward speed automatic transmission system has a structure as shown in FIG. 16 and comprises a D – A converter 1310 for analog conversion of the number of revolutions of the output shaft representing the vehicle speed into a voltage, a throttle valve opening responsive circuit 1320 for generating a voltage representing the opening of the throttle valve, two discriminating circuits 1330 and 1430, two feedback circuits 1340 and 1440, two amplifiers 1350 and 1450 and two solenoids 1280 and 1300. These elements are substantially similar to those employed in the two-forward speed automatic transmission system previously described. Referring to FIG. 17, the D – A converter 1310 is similar to the D – A converter 1310 shown in FIG. 8 in that an input supplied from the combination of the toothed disc 72, the permanent magnet 101 and the coil 102 wound around the magnet 101 shown in FIGS. 9a and 9b is converted into a voltage by the combination of an amplifying circuit 313, an amplitude limiting circuit 314 and a frequency detecting, rectifying and amplifying circuit 315 similar to those shown in FIG. 10. However, the D – A converter 1310 differs from the D – A converter 310 shown in FIG. 8 in that two outputs $E_{n1}$ and $E_{n2}$ are delivered therefrom. As shown in FIG. 17, variable resistors 1314 and 1315 are connected at one end to the output terminal of the frequency detecting, rectifying and amplifying circuit 315 and are grounded at the other end. The movable arms of the variable resistors 1314 and 1315 are connected to output leads 1312 and 1313 of the D – A converter 1310, respectively.

The throttle valve opening responsive circuit 1320 includes a switch, variable resistors and a resistor similar to the switch 322, the variable resistors 324', 325', 326', 327', 328', 329' and 330', and the resistor 331 shown in FIG. 12. The discriminating circuits 1330 and 1340 are the same as the discriminating circuit 330 shown in FIG. 8. The feedback circuits 1340 and 1440, the amplifiers 1350 and 1450, and the solenoids 1280 and 1300 are entirely the same as the feedback circuit 340, the amplifier 350 and the solenoid 280 shown in FIG. 8, respectively. The input lead 311 of the D – A converter 1310 is connected to the output terminal 103 of the revolution detecting means 70. The output leads 1312 and 1313 are connected to an input terminal 1333 of the discriminating circuit 1330 and to an input terminal 1433 of the discriminating circuit 1430, respectively. The output lead 1321 of the throttle valve opening responsive circuit 1320 is connected to an input terminal 1332 of the discriminating circuit 1330 and to an input terminal 1432 of the discriminating circuit 1430. The output lead 1331 of the discriminating circuit 1330 is connected to input terminals of the amplifier 1350 and feedback circuit 1340. The output lead of the feedback circuit 1340 is connected to an input terminal 1334 of the discriminating circuit 1330. The output lead 1351 of the amplifier 1350 is connected to the input terminal of the solenoid 1280. The output lead 1431 of the discriminating circuit 1430 is connected to input terminals of the amplifier 1450 and feedback circuit 1440. The output lead of the feedback circuit 1440 is connected to an input terminal 1434 of the discriminating circuit 1430. The output lead 1451 of the amplifier 1450 is connected to the input terminal of the solenoid 1300.

In operation, a signal delivered from the revolution detector 72 mounted on the output shaft and representing the speed of the vehicle is led through the lead 311 to the digital-analog conversion circuit 1310. This signal is passed through the amplifying circuit 313 and the amplitude limiting circuit 314 to appear as a voltage $E_n$ at the output of the frequency detecting and rectifying circuit 315 as in the case of the two-forward speed transmission system described previously. This voltage is passed through the variable resistors 1314 and 1315 so that a voltage given by $R_B/R_A \cdot E_n = HE_n$ ($H = R_B/R_A$), where $R_A$ is the resistance across the variable resistor 1314 and $R_B$ is the resistance between the movable arm of the resistor 1314 and ground, appears at the movable arm of the variable resistor 1314, and a voltage given by $R_B'/R_A' \cdot E_n = H'E_n$ ($H' = R_B'/R_A'$), where $R_A'$ is the resistance across the variable resistor 1315 and $R_B'$ is the resistance between the movable arm of the resistor 1315 and ground, appears at the movable arm of the variable resistor 1315.

In FIG. 16, the throttle valve opening responsive circuit 1320 delivers a stepped voltage signal $E_{(N)}$ ($N = 1, 2, 3 \ldots$) depending on the opening $S_\theta$ of the throttle valve in the carburetor as in the case of the two-forward speed transmission system. The discriminating circuit 1330 discriminates the difference between the output $kE_n$ from the D − A converter 1310 and the output $E_{(N)}$ ($N = 1, 2, 3, \ldots$) from the throttle valve opening responsive circuit 1320, hence whether $HE_n - E_{(N)}$ is larger or smaller than zero. The values of H and $E_{(N)}$ are so selected that the relation $HE_n - E_{(N)} = 0$ holds at the speed changing point (line) 1 in FIG. 15 at which the gear is changed from low to second gear, that is, from first to second speed. In this case, $E_{(N)}$ has seven different values. As soon as the relation $HE_n - E_{(N)} > 0$ is reached, a voltage signal is delivered from the discriminating circuit 1330 and appears on the output lead 1331. This signal is amplified by the amplifier 1350 for energizing the solenoid 1280. The speed changing point (line) 1' from second to first speed is given by the feedback circuit 1340 as in the case of the two-forward speed automatic transmission system described previously. At this point, the solenoid 1280 is de-energized.

The discriminating circuit 1340 discriminates the difference between the output $H'E_n$ from the D − A converter 1310 and the output $E_{(N)}$ ($N = 1, 2, 3, \ldots$) from the throttle valve opening responsive circuit 1320, hence whether $H'E_n - E_{(N)}$ is larger or smaller than zero. The value of $k'$ is so selected that the relation $H'E_n - E_{(N)} = 0$ holds at the speed changing point (line) 2 in FIG. 15 at which the gear is changed from second to top gear, that is, from second to third speed. It is necessary, in this case, to approximate the speed changing point (line) 2 to the ideal speed changing point (line) so that the relation $H'E_n - E_{(N)} = 0$ holds at the speed changing point (line) 2 by mere adjustment of $H'$. Thus, as soon as the relation $H'E_n - E_{(N)} > 0$ is reached, a voltage signal is delivered from the discriminating circuit 1430 and appears on the output lead 1431. This signal is amplified by the amplifier 1450 for energizing the solenoid 1300. The speed changing point (line) 2' from third to second speed is given by the feedback circuit 1440 as in the case of the two-forward speed automatic transmission system described previously. At this point, the solenoid 1300 is de-energized.

Energization and de-energization of these two solenoids in a manner as shown in following table accomplishes the meshing engagement of the gears for the first, second and third speeds, hence low, second and top gear, by the operation of the hydraulic actuating circuit in the three-forward speed automatic transmission system:

|  | Solenoid 1280 | Solenoid 1300 |
| --- | --- | --- |
| Low gear | De-energized | De-energized |
| Second gear | Energized | De-energized |
| Top gear | Energized | Energized |

We claim:
1. An automatic transmission system for use in a vehicle having an engine with a throttle valve, comprising:
   an automatic transmission unit having an input shaft and an output shaft and interconnected therebetween a speed changing gear unit including interconnected brake and clutch means capable of establishing a plurality of forward speed gear ratios,
   a fluid pressure source for supplying hydraulic fluid,
   a hydraulic actuating circuit connected between said source and transmission unit and including a manual gear position setting valve and connected thereto means including a shift valve for distributing said hydraulic fluid to control said speed changing gear unit by controlling said brake means and clutch means,
   a throttle valve opening electrically responsive circuit including therein resistance means and multi-contact switch means which step changes the effective resistance value of said resistance means for delivering a stepped voltage signal in response to the opening of said throttle valve representing the load on the engine,
   alternating voltage generating means for generating an AC voltage having a frequency proportional to the rotational speed of said output shaft of the transmission unit,
   a digital-analog conversion electrical circuit for converting said alternating voltage from said alternating voltage generating means to a voltage signal proportional to the speed of said vehicle,
   an electrical discriminating circuit having input terminals connected to receive the said stepped voltage signal from said throttle valve opening responsive circuit and the said speed proportional voltage signal from said digital-analog conversion circuit and including a differential amplifier and a feedback circuit connected across the input and output of said discriminating circuit, and
   a solenoid connected to said output of said discriminating circuit and to said shift valve for automatically operating said shift valve to control said brake and clutch means for effecting automatic selection of said forward speed gear ratios in said speed changing gear unit.

2. An automatic transmission system according to claim 1 wherein:
   said discriminating circuit input terminals includes first, second and third input terminals and said discriminating circuit has an output terminal and said differential amplifier has two input terminals,
   a first variable resistor whose resistance element is connected between said first input terminal and ground and whose movable arm is connected to one input terminal of said differential amplifier,
   a second variable resistor whose resistance element is connected between said second and third input terminals and whose movable arm is connected to the other input terminal of said differential amplifier, said feedback circuit being connected between said third input terminal and said output terminal of said discriminating circuit, said feedback circuit including a third resistor connected between said third input terminal and ground, a first transistor having a collector-emitter path connected in parallel with said third resistor and having a base-emitter path, and a second transistor having collector-emitter path connected in parallel with said base-emitter path of said first transistor and having a base connected to said output terminal of said discriminating circuit.

3. An automatic transmission system for use in a vehicle having an engine with a throttle valve, comprising:

an automatic transmission unit having an input shaft and an output shaft and interconnected therebetween a speed changing gear unit including interconnected brake and clutch means capable of establishing several forward speed gear ratios, a fluid pressure source for supplying hydraulic fluid, a hydraulic actuating circuit including a manual gear position setting valve and connected thereto means including a plurality of shift valves for distributing said hydraulic cluid to control said speed changing gear unit by controlling said brake means and clutch means, a throttle valve opening electrically responsive circuit including therein resistance means and multi-contact switch means which step changes the effective resistance value of said resistance means for delivering a stepped voltage signal in response to the opening of said throttle valve representinv the load on the engine, alternating voltage generating means for generating an AC voltage having a frequency proportional to the rotational speed of said output shaft of the transmission unit, a digital-analog conversion electrical circuit for converting said alternating voltage from said alternating voltage generating means to a voltage signal proportional to the speed of said vehicle, a plurality of electrical discriminating circuits each having input terminals connected to receive the said stepped coltage signal from said throttle valve opening responsive circuit and the said speed proportional voltage signal from said digital-analog conversion circuit and each including a respective differential amplifier and a respective feedback circuit connected across the input and output of the respective discriminating circuit, and a plurality of solenoids, each respectively connected between one of said discriminating circuits and the respective one of said shift valves for automatically operating said shift valves to control said brake and clutch means for effecting automatic selection from among said several forward speed gear ratios in said speed changing gear unit.

4. For use with a vehicle having an automatic transmission system and an engine with a throttle valve said system including an automatic transmission unit having an input shaft and an output shaft and interconnected therebetween a speed changing gear unit including interconnected brake and clutch means capable of establishing a plurality of forward speed gear ratios, a fluid pressure source for supplying hydraulic fluid, and a hydraulic actuating circuit including a manual gear position setting valve and connected thereto means including a shift valve for distributing said hydraulic fluid to control said speed changing gear unit by controlling said brake means and clutch means, the improvements comprising:

a throttle valve opening electrically responsive circuit including therein resistance means and multi-contact switch means which step changes the effective resistance value of said resistance means for delivering a stepped voltage signal representing different openings of said throttle valve, alternating voltage generating means for generating an AC voltage having a frequency proportional to the rotational speed of said output shaft of the transmission unit, an electrical digital-analog conversion circuit for converting said alternating voltage from said alternating voltage generating means to a voltage signal proportional to the speed of said vehicle, an electrical discriminating circuit having input terminals connected to receive the said stepped voltage signal from said throttle valve opening responsive circuit and the said speed proportional voltage signal from said digital-analog conversion circuit and including a differential amplifier and a feedback circuit connected across the input and output of said discriminating circuit, and a solenoid connected between the output of said discriminating circuit and said shift valve for automatically operating said shift valve to control said brake and clutch means for effecting automatic selection of said forward speed gear ratios in said speed changing gear unit.

5. An automatic transmission system according to claim 4 wherein:

said discriminating circuit input terminals includes first, second and third input terminals and said discriminating circuit has an output terminal and said differential amplifier has two input terminals, a first variable resistor whose resistance element is connected between said first input terminal and ground and whose movable arm is connected to one input terminal of said differential amplifier, a second variable resistor whose resistance element is connected between said second and third input terminals and whose movable arm is connected to the other input terminal of said differential amplifier, said feedback circuit being connected between said third input terminal and said output terminal of said discriminating circuit, said feedback circuit including a third resistor connected between said third input terminal and ground, a first transistor having a collector-emitter path connected in parallel with said third resistor and having a base-emitter path, and a second transistor having a collector-emitter path connected in parallel with said base-emitter path of said first transistor and having a base connected to said output terminal of said discriminating circuit.

6. For use with a vehicle having an automatic transmission system and an engine with a throttle valve, said system including an automatic transmission unit having an input shaft and an output shaft and interconnected therebetween a speed changing gear unit including interconnected brake and clutch means capable of establishing several forward speed gear ratios, a fluid pressure source for supplying hydraulic fluid, and a hydraulic actuating circuit including a manual gear position setting valve and connected thereto means including a plurality of shift valves for distributing said hydraulic fluid to control said speed changing gear unit by controlling said brake means and clutch means, the improvement comprising:

a throttle valve opening electrically responsive circuit including therein resistance means and multi-contact switch means which step changes the effective resistance value of said resistance means for delivering a stepped voltage signal representing different openings of said throttle valve, alternating voltage generating means for generating an AC voltage having a frequency proportional to the rotational speed of said output shaft of the transmission unit, an electrical digital-analog conversion circuit for converting said alternating voltage from said alternating voltage generating means to a voltage signal proportional to the speed of said vehicle, a plurality of electrical discriminating circuits each having input terminals connected to receive the said stepped voltage signal from said throttle valve opening responsive circuit and the said speed proportional voltage signal from said digital-analog conversion circuit and each including a respective differential amplifier and a respective feedback circuit connected across the input and output of the respective discriminating circuit, and a plurality of solenoids, each respectively connected between one of said discriminating circuits and the respective one of said shift valves for automatically operating said shift valves to control said brake and clutch means for effecting automatic selection from among said several forward speed gear ratios in said speed changing gear unit.

* * * * *